United States Patent [19]

Werman

[11] 3,907,328
[45] Sept. 23, 1975

[54] INFLATABLE AIR BAG FOR MOTOR VEHICLES FOR ATTENUATING THE IMPACT EFFECT OF THE PASSENGER IN CASE OF ACCIDENT

[75] Inventor: Per Olof Werman, Stockholm, Sweden

[73] Assignee: Klippan G.m.b.H. Hamburg, Hamburg, Germany

[22] Filed: June 14, 1973

[21] Appl. No.: 370,087

Related U.S. Application Data

[62] Division of Ser. No. 152,129, June 11, 1971, Pat. No. 3,788,663.

[30] Foreign Application Priority Data

June 20, 1970 Germany.............................. 2030518

[52] U.S. Cl..................... 280/150 AB; 280/150 AB
[51] Int. Cl.²........................................ B60R 21/08
[58] Field of Search .......... 280/150 AB; 244/138 R; 5/348, 347

[56] References Cited
UNITED STATES PATENTS

| | | | |
|---|---|---|---|
| 2,712,913 | 7/1955 | Stanley ......................... | 293/DIG. 3 |
| 2,974,912 | 3/1961 | Namsick ........................ | 244/138 R |
| 3,603,430 | 9/1971 | Kendall et al.......................... | 5/347 |
| 3,624,810 | 11/1971 | Hass .............................. | 280/150 AB |
| 3,840,246 | 10/1974 | McCullough et al......... | 280/150 AB |

*Primary Examiner*—Kenneth H. Betts
*Attorney, Agent, or Firm*—Ernest D. Buff; Jonathan Plaut

[57] ABSTRACT

Inflatable air bag having one or several air intake openings for drawing air from the passenger compartment into the air bag, and closure means for automatically sealing the air intake openings after inflation of the air bag. The closure means may consist of bands, tubes, flaps and the like.

1 Claim, 8 Drawing Figures

INFLATABLE AIR BAG FOR MOTOR VEHICLES FOR ATTENUATING THE IMPACT EFFECT OF THE PASSENGER IN CASE OF ACCIDENT

This is a division of Application Ser. No. 152,129, filed June 11, 1971, now U.S. Pat. No. 3,788,663.

SUMMARY OF THE INVENTION

The present invention relates to an inflatable air bag for motor vehicles for attenuating the impact effect of the passenger in case of accident.

The air bags heretofore known are filled with a gas introduced into the ballonet by opening a gas cartridge when the vehicle is involved in an accident. A disadvantage of air bags of this type is that an extremely strong pressure wave is created within the passenger compartment when the air bag is suddenly inflated. This pressure wave results from the fact that the volume of gas required for filling the air bag is introduced from the gas cartridge into the passenger compartment, in addition to the air already contained therein.

It is the object of the present invention to provide an air bag that produces, when inflated, a less strong pressure wave by utilizing a smaller quantity of air that is introduced additionally into the passenger compartment.

This object may be achieved, according to the present invention, by providing the air bag with at least one air intake opening in its wall, and with closure means for automatically sealing the air intake opening after inflation of the air bag. With such an arrangement, air contained in the passenger compartment is used to a substantial extent for completely filling the air bag when the air bag is inflated by the introduction of a gas supplied from a gas cartridge. Since during inflation of the air bag a substantial quantity of air from the passenger compartment may be drawn into the air bag, less gas must be introduced from the gas cartridge into the passenger compartment thus resulting in a smaller pressure wave created therein.

It has been shown to be particularly effective if the air bag includes two for example U-shaped inflatable tubes connected to each other by a fabric, and furthermore the air intake openings are arranged in the fabric. With such an arrangement it is merely required to fill the tubes with gas supplied from the gas cartridge. It is self-understood that the invention is not restricted to filling the air bag with a gas. Instead of gas, there exists principally the possibility to fill the individual tubes with a different fluid such as for example water.

The closure means at the air intake openings are necessary in order to prevent the air from escaping too rapidly through the air intake openings when the passenger hits the air bag. These closure means may be of any suitable type. Thus it is possible to provide as the closure means so-called Rideau type bands which will shift under tension during inflation of the air bag so as to seal an intake opening during inflation of the air bag or after the air bag has been inflated completely. In lieu of such bands there may also be provided a closure means consisting of a flap operating in the manner of a check valve, i.e. which is in the open position during inflation of the air bag and will be biased into the closed position when an external pressure is exerted upon the air bag.

In the following, some preferred illustrative embodiments of the invention will be explained with reference to the drawing in which FIG. 1 is an air bag in the inflated condition and consisting essentially of two U-shaped tubes and a fabric, according to the present invention;

Figure 1:
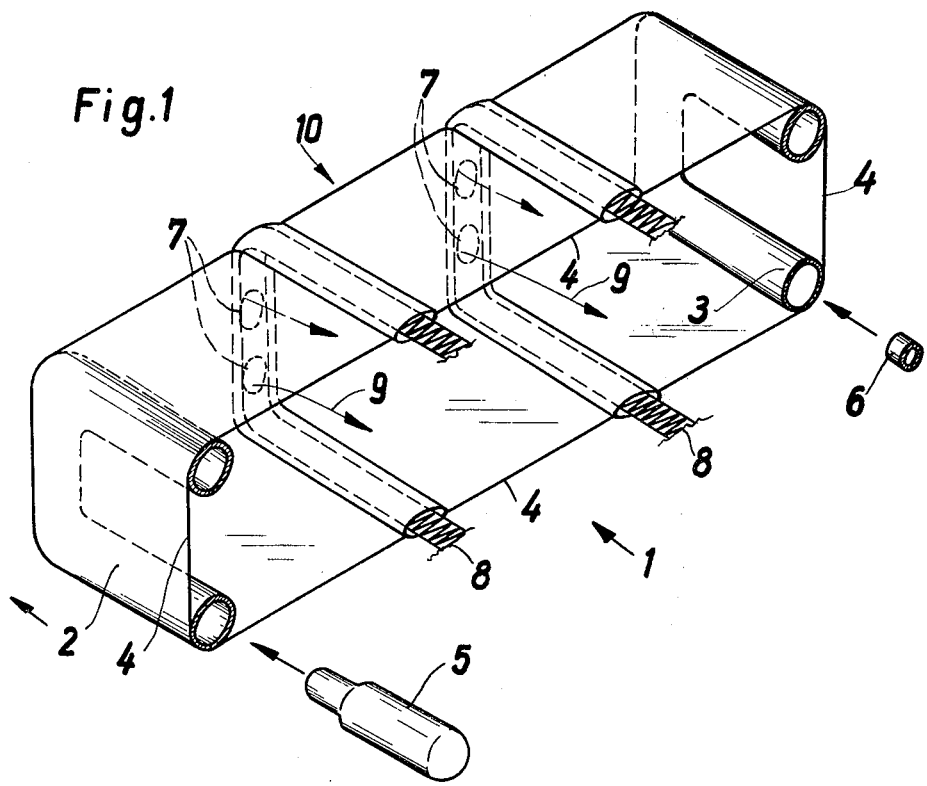

Referring to FIG. 1, the air bag of the present invention designated as a whole by the reference numeral 1 consists essentially of two U-shaped tubes 2 and 3 which are covered by a fabric 4 and are adapted to impart to the air bag a somewhat box-shaped configuration in the inflated condition.

Two gas cartridges 5 and 6 (one of which is only partially shown) are provided for inflating the air bag 1. The gas cartridges 5 and 6 are connected by conduit means (not shown) to the lower openings of tubes 2 and 3, and deliver a gas into the lower openings respectively of the two tubes 2 and 3, which are closed at their upper ends. Several air intake openings 7 are arranged in the front wall of the fabric 4. During the inflation of the air bag, air from the passenger compartment may enter the air bag through these intake openings 7. Two so-called Rideau type bands 8 are provided at the fabric 4 within the zones defined by the air intake openings 7. These bands 8 are arranged in a manner so as to keep the intake openings 7 free during inflation of the air bag 1 but to seal these openings when the air bag has been inflated. This may be reached for example by providing these bands 8 with rubber webbings shifting under tension the bands 8 across the openings 7. As a consequence, the openings 7 are kept sealed when subsequent to the inflation of the tubes 2 and 3 and the concurrent development of the fabric 4, along with the introduction of air from the passenger compartment, according to the arrows 9, a pressure in the direction of the arrow 10 will be exerted from the outside onto the inflated air bag 1.

Figure 2:
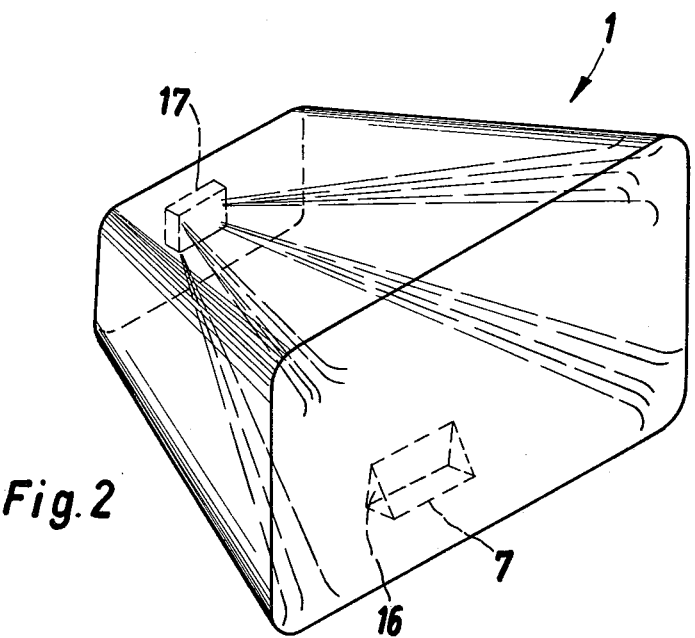
FIG. 2 is an air bag in the inflated condition and having a flap-like closure means.

Referring to the embodiment shown in FIG. 2, there is provided an approximately rectangular opening 7 at the front wall of the air bag. A flap 16 is attached to the upper edge of the opening 7. This flap 16 will be held in the open position during inflation of the air bag. As soon as the inflation of the air bag has been at least almost fully completed, the flap 16 will be brought into contact with and moved to the closed position by a gas or water jet directed from a nozzle 17 against the back side of the flap 16. This nozzle 17 communicates with the gas cartridges through conduit means (not shown) and may also be used to shortly before effect an instantaneous development of the air bag 1 by means of suitably directed gas or fluid jets. Preferably, the gas or fluid jets are directed towards the corners at the front wall of the air bag.

Figure 3:
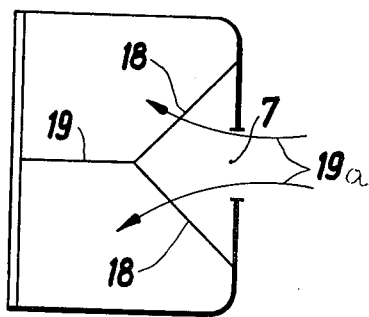
FIG. 3 is a cross-sectional view of an air bag having as the closure means an elastic band.
Figure 4:
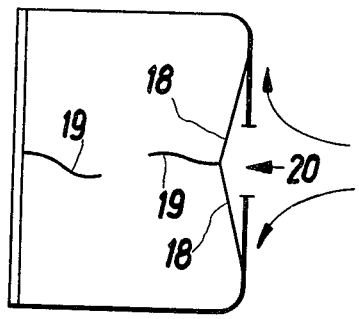
FIG. 4 shows the air bag of FIG. 3 at the end of the process of inflation.

FIGS. 3 and 4 illustrate an air bag in which the air intake opening 7 is arranged in the front wall and in front of an elastic band 18. In the inflation condition shown in FIG. 3, this band 18 is kept under tension in the open position apart from the air intake opening 7 by means of a strip 19 having a rated breaking stress, i.e. rupturing when a predetermined stress is exceeded, so that air from the passenger compartment may enter the air bag as indicated by the arrows 19a. As soon as the air bag has been inflated to a certain extent, the strip 19 breaks and the elastic band 18 is applied against and seals the opening 7. In this condition no additional air will be drawn into the air bag and very little air may escape again from the bag if a pressure is exerted upon the air bag, for example by a passenger, in the direction indicated by the arrow 20.

Figure 5:
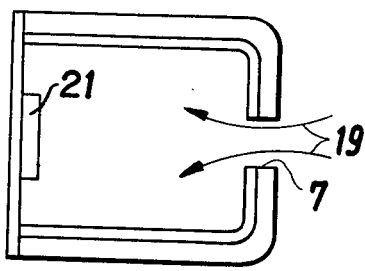
FIG. 5 is a cross-sectional view of an air bag during inflation and provided with an inflatable tube as the closure means.
Figure 6:
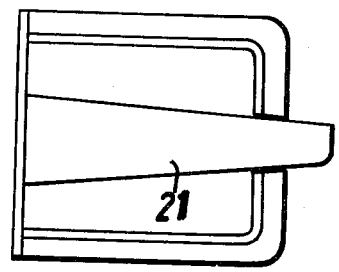
FIG. 6 shows the air bag of FIG. 5 at the end of the process of inflation.

In the embodiment shown in FIGS. 5 and 6 an inflatable tube 21 is provided at the rear wall of the air bag and serves as the closure means. This tube 21 communicates with a gas cartridge (not shown) through conduit means (not shown) and will be inflated after the air bag has been inflated. In the inflated condition, the free end of the tube 21 extends through the air intake opening 7 at the front wall of the air bag.

Figure 7:
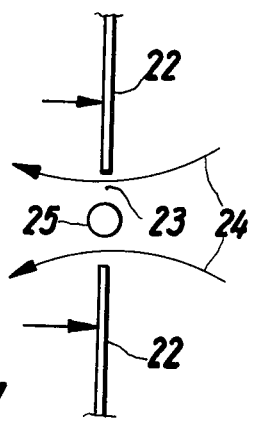
FIG. 7 is a fragmentary cross-sectional view of an air bag with inflatable closure means during inflation.
Figure 8:
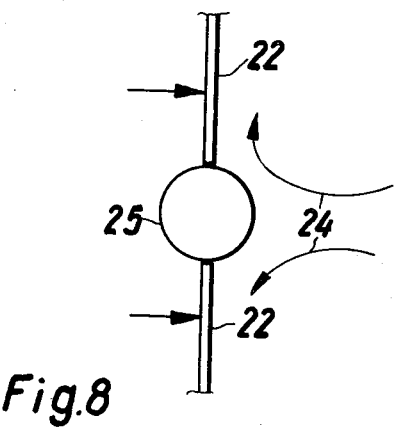
FIG. 8 is an illustration similar to FIG. 7 and shows the same portion of the air bag at the end of the process of inflation.

A similar arrangement is shown in the embodiment illustrated in FIGS. 7 and 8. In this embodiment, there is provided a longitudinal opening 23 for the entry of air, according to the arrows 24, FIG. 7, in the front wall 22 of the air bag. Within this longitudinal opening 23 there is arranged an inflatable tube 25 which communicates with a gas cartridge (not shown), through conduit means (not shown) and which serves as the closure means. This tube 25 will be developed after the air bag has been almost fully inflated.

What is claimed is:

1. In an inflatable air bag disposed within the passenger compartment of a motor vehicle subject to impact and adapted for inflation with fluid supplied in part from a cartridge upon impact of the vehicle, the improvement wherein said bag has (a) a plurality of U-shaped tubes, each of said tubes being connected at one end to the cartridge and being disposed within said bag, (b) at least one air intake opening provided in the front wall thereof, and (c) closure means operably associated with said air intake opening for automatically sealing said air intake opening after inflation of said bag, said closure means comprising an inflatable tube having a free end which, upon inflation of said tube, extends through and seals said air intake opening.

* * * * *